US012740505B2

(12) United States Patent
Puranik et al.

(10) Patent No.: US 12,740,505 B2
(45) Date of Patent: Sep. 22, 2026

(54) SAPLING PLANTING UNIT

(71) Applicant: Deere & Company, Moline, IL (US)

(72) Inventors: Vishal Puranik, Pune (IN); Syed Gouse Moiddin, Pune (IN)

(73) Assignee: DEERE & COMPANY, Moline, IL (US)

( * ) Notice: Subject to any disclaimer, the term of this patent is extended or adjusted under 35 U.S.C. 154(b) by 295 days.

(21) Appl. No.: 18/627,493

(22) Filed: Apr. 5, 2024

(65) Prior Publication Data

US 2025/0040474 A1 Feb. 6, 2025

(30) Foreign Application Priority Data

Aug. 5, 2023 (IN) ............................. 202321052724

(51) Int. Cl.
*A01C 11/02* (2006.01)

(52) U.S. Cl.
CPC ................................. *A01C 11/025* (2013.01)

(58) Field of Classification Search
CPC .................................................. A01C 11/025
See application file for complete search history.

(56) References Cited

U.S. PATENT DOCUMENTS 3,446,164 A * 5/1969 Huang ................. A01C 11/025 111/105
3,712,252 A * 1/1973 Huang ................. A01C 11/025 47/87
5,445,089 A * 8/1995 Houng ................. A01C 11/025 47/1.01 R
5,573,558 A * 11/1996 Huang .................. A01C 11/02 47/1.01 R
11,483,964 B2 11/2022 Moiddin et al.
2020/0375089 A1* 12/2020 Crouse ................ A01C 11/025

FOREIGN PATENT DOCUMENTS

WO WO 2018098576 A1 6/2018

OTHER PUBLICATIONS

RISUTEC Productive and Integrated Forestation Combine All Stages of Establishment, pp. 1-12, [online]. Retrieved from the Internet <URL: https://risutec.fi/>.

Z-Forest and Precision Forest Building, Youtube, pp. 1-2, [online]. Retrieved from the Internet <URL: https://www.youtube.com/watch?v=_qPZy05uTC4>.

* cited by examiner

*Primary Examiner* — Matthew R Buck

(57) ABSTRACT

A sapling indexing unit for a transplanter, the sapling indexing unit comprising a channel track. An intermediary unit is movably coupled to the channel track. The intermediary unit comprises a plurality of tubes arranged vertically and each having a top and a bottom. A base frame is proximal to the bottom of the plurality of tubes and an aperture is defined by the base frame. A drive mechanism is configured to provide horizontal movement to the intermediary unit relative to the base frame and the aperture.

13 Claims, 7 Drawing Sheets

SAPLING PLANTING UNIT

CROSS-REFERENCE TO RELATED APPLICATIONS

This application claims priority under 35 U.S.C. § 119 to patent application IN 202321052724, filed on 5 Aug. 2023, the disclosure of which is incorporated herein by reference.

FIELD OF THE DISCLOSURE

The present disclosure relates to silviculture and more specifically a sapling indexing unit of a transplanter for forests.

BACKGROUND OF THE DISCLOSURE

The silviculture process can be slow, cumbersome, and may require careful handling because the process involves planting fragile saplings into the ground. Furthermore, precision in planting depth, subsequent watering, fertilization, water retention around the sapling, and adequate spacing between saplings are some of many variables adding to the complexity to optimize the survival rates and growth of saplings once planted. Saplings can generally be sensitive to environmental conditions, handling, and conditions of planting. Generally done by hand, therein lies a need for an automated or semi-automated process to efficiently and carefully plant a multitude of saplings into the ground to support reforestation efforts.

An automated or semi-automated planting process may aim to plant a maximum number of saplings with high-speed and precision planting operation considering time duration, economy, cost factor, and an availability of manpower, etc. As a part of high-speed and precision planting, the planter vehicle or transplanter needs to store a large volume of saplings, which are brought from the nursery to the planting field. The thousands of saplings typically come in multiple sapling trays. The sapling trays need to be stored and conveyed/transferred to the planting unit (which plants the saplings) in such a manner as not to affect the sapling quality and life. To fulfill such a requirement the planting vehicle or the transplanter needs to have a sapling indexing unit to transfer a single sapling to the sapling planting unit with precision and accuracy at the high operating speed. Hence, there is a need for a new sapling indexing unit which obviates the problems of the currently available systems.

The present disclosure envisages achieving at least one of the following objects including providing a sapling indexing unit for organizing the plurality of saplings received from the sapling gripping unit and transferring one sapling to the sapling planting unit at any given time. Another object is to provide an actuation mechanism for operating of the sapling indexing unit. Yet another object is to optimize the operation of sapling indexing unit.

Other objects of the present disclosure will be apparent when the description of the disclosure is read in conjunction with the accompanying drawings. The accompanying drawings provided herein are merely illustrative and are not intended to limit the scope and ambit of the present disclosure.

SUMMARY OF THE DISCLOSURE

In accordance with the present disclosure, there is provided a sapling indexing unit for a transplanter. The sapling indexing unit comprises a channel track, an intermediary unit, a base frame, and a drive mechanism. The intermediary unit comprises a plurality of tubes movably coupled to the channel track. The base frame is placed proximal to the bottom of the intermediary unit and an aperture associated with the base frame. The drive mechanism is configured to provide horizontal movement to the intermediary unit relative to the base frame and the aperture. The drive mechanism may comprise a linear actuator. Each tube of the plurality of tubes comprises a top that is configured to receive a sapling. A discharge flap is pivotably coupled to a bottom of at least one of the plurality of tubes and is configured to be in a closed state or an open state. Each discharge flap switches to the open state when the aperture aligns with the discharge flap. The sapling indexing system comprises a controller to control the drive unit in a predetermined sequence.

While the foregoing specification has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure which comes within known or customary practice in the art to which this disclosure pertains.

Other features and aspects will become apparent by consideration of the detailed description and accompanying drawings.

Before any embodiments are explained in detail, it is to be understood that the disclosure is not limited in its application to the details of construction and the system of components set forth in the following description or illustrated in the following drawings. The disclosure is capable of other embodiments and of being practiced or of being carried out in various ways. Further embodiments of the disclosure may include any combination of features from one or more dependent claims, and such features may be incorporated, collectively or separately, into any independent claim.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, the term “controller” is a computing device including a processor and a memory. The “controller” may be a single device or alternatively multiple devices.

As used herein, the term “module” refers to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, unless otherwise limited or modified, lists with elements that are separated by conjunctive terms (e.g., “and”) and that are also preceded by the phrase “one or more of” or “at least one of” indicate configurations or arrangements that potentially include individual elements of the list, or any combination thereof. For example, “at least one of A, B, and C” or “one or more of A, B, and C” indicates the possibilities of only A, only B, only C, or any combination of two or more of A, B, and C (e.g., A and B; B and C; A and C; or A, B, and C).

Figure 1:
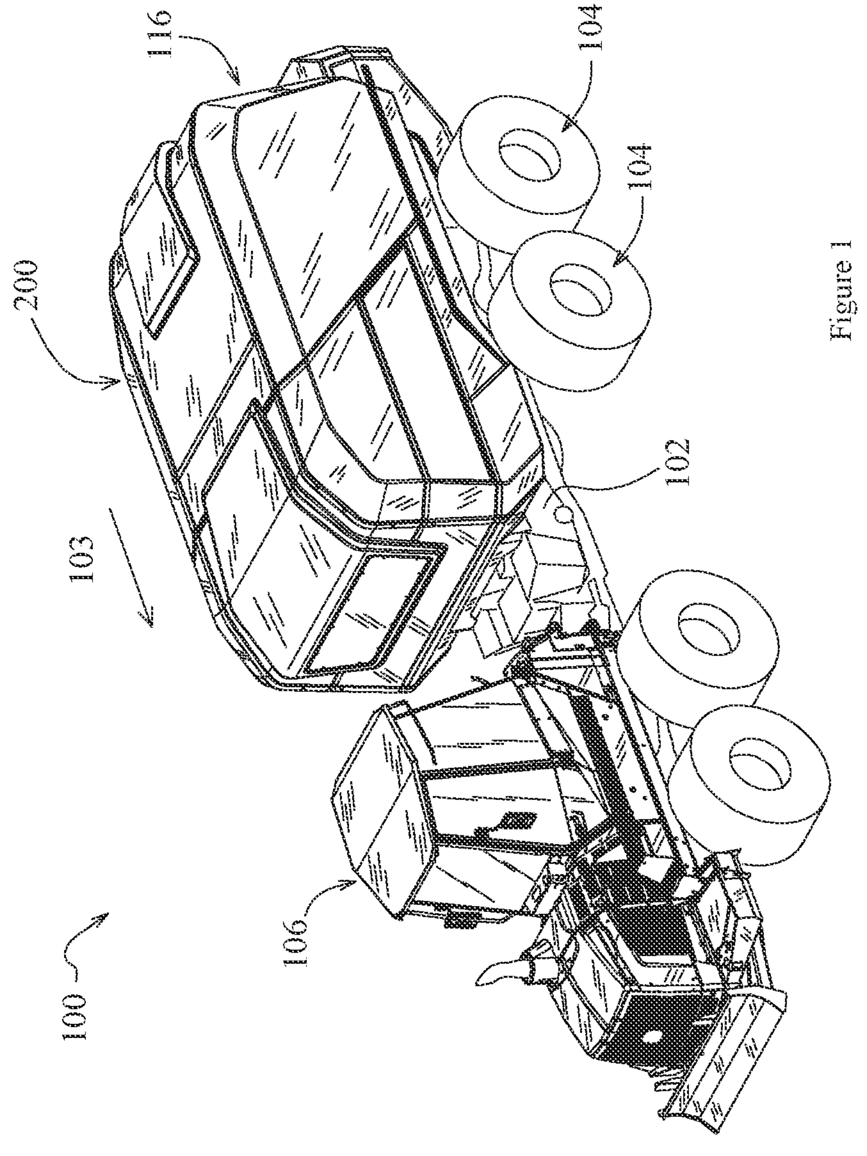
FIG. 1 illustrates a work machine with a transplanter coupled at a rear end.

FIG. 1 illustrates a perspective view of a work machine 100 comprising a sapling transplanter 200. A sapling planting apparatus 300 (shown in FIG. 2) may be attached at a rear end of the sapling transplanter 200, according to one embodiment. It is intended that the sapling planting apparatus 300 provides for continuous sapling planting wherein the work machine 100 continues to advance as the apparatus plants the sapling into the ground, thereby advantageously reducing fuel consumption and increasing efficiency by minimizing a stop/start of the work machine 100 when planting. An alternative embodiment may comprise a sapling transplanter 200 coupled to a work machine 100, such as a tractor, rather than a singular piece of equipment. Therein, the term work machine 100 may include a transplanter 200 on a work machine 100, or a work machine 100 towing a sapling transplanter 200. Note the sapling planting apparatus 300 is one of several subcomponents found within the planter vehicle. Furthermore, the terms “work machine,” “planter vehicle” and “transplanter” may be used interchangeably throughout this disclosure.

The work machine 100 may comprise of one or more subcomponents and/or subsystems described herein to automate or semi-automate the sapling planting process. The present disclosure includes a planting vehicle with multiple subsystems. However, used holistically or in part, these subsystems provide an improved process for planting multiple saplings through the automated or a semi-automated process. The work machine 100 may include a chassis 102, ground-engaging supports 104, such as wheels, and a propulsion system (not shown). The propulsion system, such as a diesel engine or motor, or an electric engine provides for motive power driving the wheels and for operating the other components associated with the work machine 100 such as actuators. The operator cab 106, or alternatively a remote operating station (not shown) where an operator sits when operating the work machine 100, includes a user input interface with a plurality of controls (e.g. switches, joysticks, pedals, buttons, levers, display screens, etc.) for controlling the work machine 100 during operation thereof.

Figure 2:
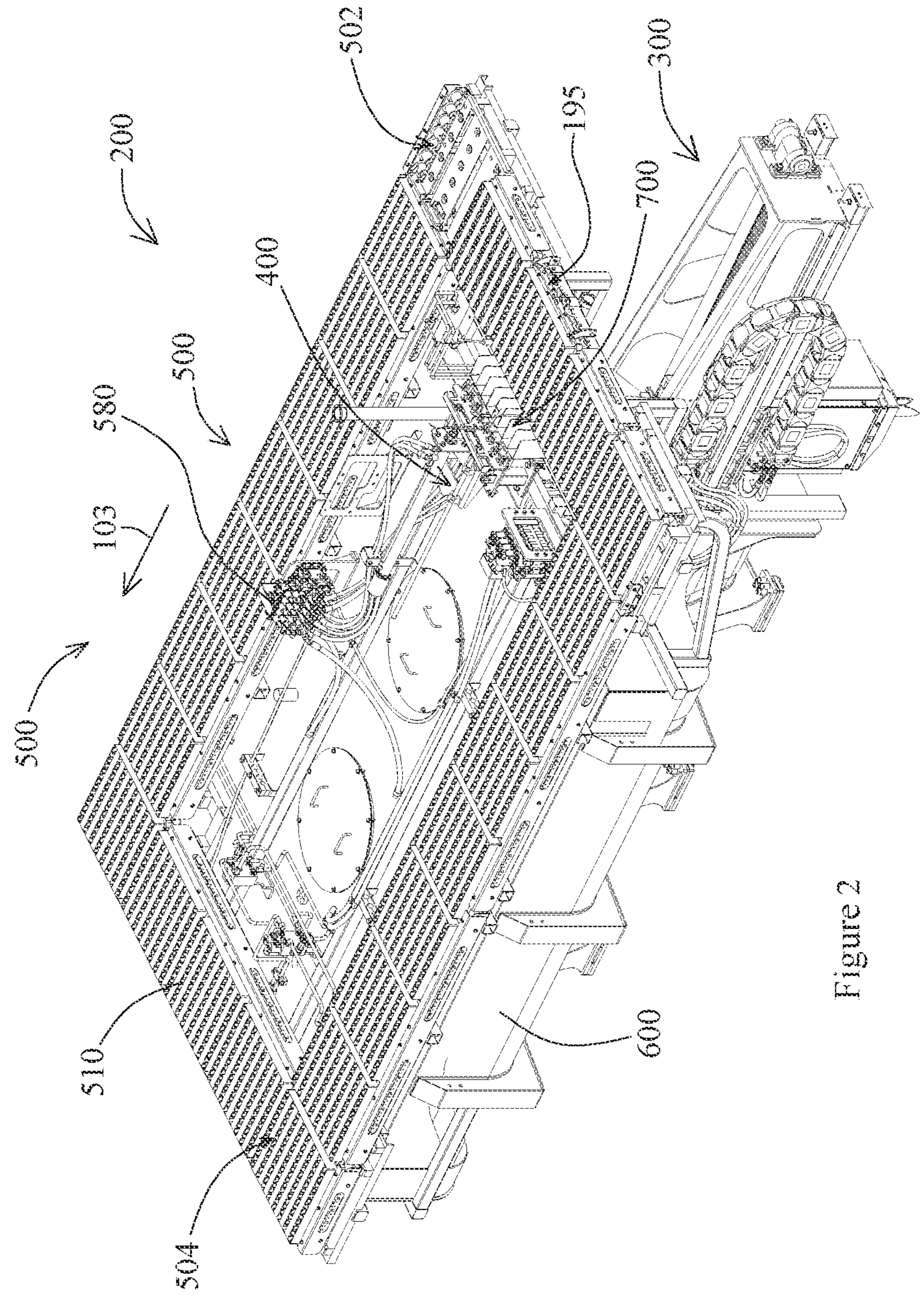
FIG. 2 illustrates a perspective view of a sapling tray handling system attached to a transplanter frame.

As depicted in FIGS. 1 and 2, the forward portion or direction 103 of the work machine 100 is generally to the left and the rearward portion or direction of the work machine 100 is generally to the right. The work machine 100 may include a sapling retrieval apparatus 400 (FIG. 2) which retrieves saplings from a sapling tray handling system 500 and feeds saplings into the sapling planting unit 300. The work machine 100 may further include an external housing 116, which generally shields various subcomponents of the work machine 100 from dust, debris, winds, rain, and other harsh environmental conditions. The primary subcomponents and subsystems may include the sapling tray handling system 500, the sapling retrieval apparatus 400, the sapling planting unit 300, and the sapling hydrating module 600 (which includes the water tank), and a sapling transfer and indexing system 700.

A controller 180 may have one or more microprocessor-based electronic control units or controllers which perform calculations and comparisons and execute instructions. The controller 180 may also include a processor, a core, volatile and non-volatile memory, digital and analog inputs, and digital and analog outputs. The controller 180 may connect to and communicate with various input and output devices including, but not limited to, switches, relays, solenoids, actuators, light emitting diodes (LED’s), liquid crystal displays (LCD’s) and other types of displays, radio frequency devices (RFD’s), sensors, and other controllers. The controller 180 may receive communication or signals, via electrically or any suitable electromagnetic communication, from one or more devices, determine an appropriate response or action, and send communication or signals to one or more devices. The controller 180 can be a programmable logic controller, also known as a PLC or programmable controller. The controller 180 may couple to a separate work machine electronic control system through a data bus, such as a CAN bus, or the controller 180 can be a part of the work machine electronic control system.

The controller 180 may be in communication with one or more devices including, but not limited to, a vehicle speed sensor to receive information about the vehicle speed; position/proximity sensors to receive various positional inputs about the sapling stock as it moves through the work machine 100; geo-location sensors to receive information about the planter vehicle’s location; obstruction detector sensors; the pump and/or pump controller to provide commands or instructions and/or receive information about direction and flow of hydrating fluid to and from the hydrating fluid storage tank; visual inputs from cameras; and the user input interface to receive commands or instructions and provide feedback. The controller 180 may receive communication from and provide communications, controls, or instructions to any of these devices and any of the subcomponents. This list is not all-inclusive and is detailed further below.

The work machine 100 may move across a field and retrieve one or more saplings 518 (e.g., a eucalyptus tree) from its sapling tray handling unit 500. The work machine 100 may then plant a sapling 518 into the ground, while watering and or fertilizing the sapling 518. Note that the while the present embodiment demonstrates planting of a single sapling 518 at any given moment, the mechanism can be configured to plant two or more saplings at any given moment. The sapling tray handling system 500 comprises a rectangular loop track 502 to support a multitude of trays 504, the trays 504 collectively have the capacity to hold thousands of saplings 518. The sapling tray handling system 500 comprises a rectangular loop track thereby minimizing the footprint traversing the ground, while maximizing storage capacity of the sapling tray handling system 500 by transferring the plurality of trays within the track on the horizontal plane. A sapling hydrating module 600 is found below the rectangular track to optimize usage of space. Furthermore, the smaller footprint allows for ease of transportation along industry standard roadways when transporting the work machine 100 from a first location to a second location.

The saplings 518 are grouped in trays 510. The sapling tray handling system 500 is configured to convey the trays 510 holding rows of saplings 520 towards the sapling retrieval apparatus 400 (FIG. 2) and indexes to a next tray 510 as each tray is emptied by the sapling retrieval apparatus 400. Trays 510 are replaced by an operator in an access area 195, wherein the operator may reload the sapling tray handling system 500 with a new set of filled trays 510. The trays 510 are removably placed for sliding engagement on roller frames 538 in the track of the sapling tray handling system 500. In an embodiment shown in FIG. 2, the access area 195 is the same as the pickup area defined by the placement of the sapling retrieval apparatus 400. The pickup area is where the sapling retrieval apparatus 400 may access the saplings 518. The controller 180 is programmed to control operation of the sapling tray handling system 500, wherein the controller 180 actuates a drive mechanism 580 upon receipt of proximity sensor input signals. A plurality of tags including information distinguishing each individual sapling (e.g., an identification code), row of saplings, or tray of saplings from others may be attached to trays, wherein the controller 180 is programmed to record information from a tag reader and process the information as the sapling is planted, thereby correlating the identification code with a geolocation of the sapling 518. This information may be aggregated in memory, thereby mapping productivity as it occurs. In one embodiment, the information can be visually displayed on a user input interface (not shown) as the planter vehicle progresses, or after completion of a sapling lot.

Figure 3:
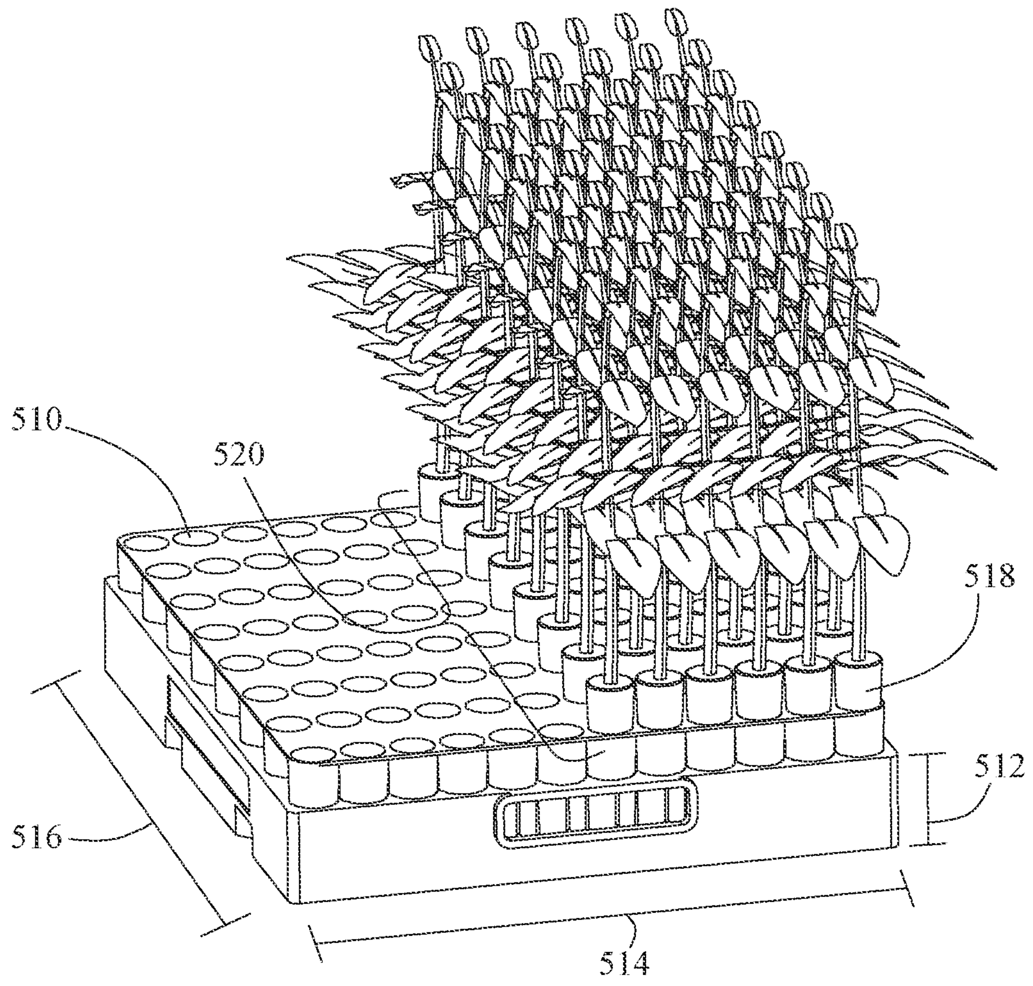
FIG. 3 illustrates a sapling tray partially filled with saplings.

In the embodiment shown in FIG. 3, each sapling tray 510 may carry a plurality of saplings 518 in multiple rows 520. Each tray preferably carries eight rows and thirteen columns of saplings thus may accommodate one hundred and four saplings. The overall dimensions of the tray including width 516, length 514 and height 512 are optimized to fit into the track 502. In one embodiment the width 516 and length 514 of the tray are approximately equal such that the tray 510 traverses the track 502 efficiently. As shown in FIG. 2, the sapling tray handling system 500 may accommodate the multitude of trays 504 preferably twenty-three trays and thus may handle 2392 saplings. However, the above numbers are not limiting and may vary according to design and size of the transplanter 200. Further, the track 502 is fixed above the water tank of the hydrating module 600. In one embodiment, the sapling retrieval apparatus 400 is placed beside the track 502, proximal to the sapling planting unit 300 and a sapling transfer and indexing system 700 is placed between the two to convey the saplings from sapling retrieval apparatus to the planting unit 300.

FIG. 2 further shows the tray access area 195. The tray access area 195 allows an operator to unload empty trays and load trays with saplings 518. In a closed position, the gate 560 works like a roller frame and allows smooth movement of the sapling tray 510 and holds the tray when trays are not moving. The gate 560 has as latch 564 with a spring mechanism to keep the gate 560 in the closed position during normal operation. The access area 195 further has a base plate 546 to support the sapling tray 510 during the sapling pickup by the sapling retrieval apparatus 400 and loading or unloading of trays. During the loading operation, the operator unlocks the latch 564 and opens the gate 560. Once the gate is open, the operator may remove the trays and add trays. In one embodiment, to assist the operator in loading the trays, the controller 180 may actuate the four actuators positioned at corners and move the trays as the operator adds or removes the trays from the loading area 195. During the loading operation, it is contemplated that the controller 180 may operate the actuators automatically by sensing the position of trays or receive input from the operator to move the trays. In an additional embodiment, the operator may move the trays manually during the unloading or loading of saplings trays.

Figures 4, 5:
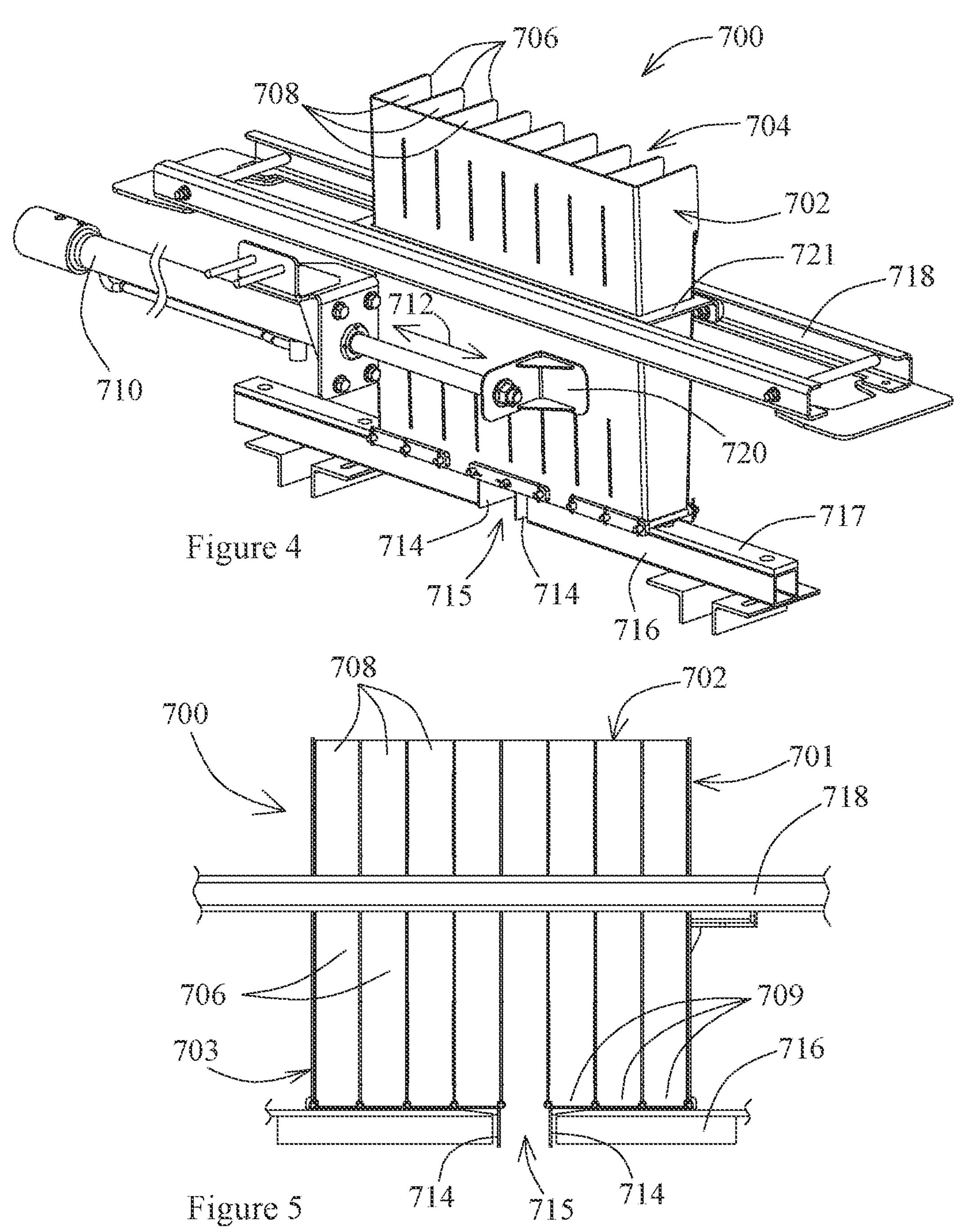
FIG. 4 illustrates a sapling indexing unit.
FIG. 5 illustrates an intermediary unit.

FIG. 4 illustrates the sapling indexing unit 420. The sapling indexing unit 420 comprises a channel track 718 rigidly fixed to the transplanter 100 between the sapling retrieval apparatus 400 and the track 402. The channel track 718 may further comprise a pair of tracks with each track being formed out of a C-channel. An intermediary unit 702 having a top end 701 and a bottom end 703 is slidably supported within the channel track 718 by means of rollers 722. A base frame 716 having a first surface 717 is placed below the intermediary unit 702 such that the bottom end 703 of the intermediary unit 702 slides above the first surface 717 of the base frame 716. The base frame 716 is fixedly coupled to the transplanter 100. In one embodiment, a low friction material coating is applied to the first surface 717 of the base frame 716 to reduce friction between the intermediary unit 702 and the base frame 716. In the given embodiment, the base frame 716 is shown as a rectangular channel. However, it is contemplated that the base frame 716 may be selected from any shape including but not limited to a L channel, C channel, angled channel, etc.

A drive mechanism 710 is coupled to the intermediary unit 702 to move the intermediary unit 702 relative to the channel track 718 and the base frame 716. In one embodiment, the drive mechanism 710 is a linear actuator and coupled to the intermediary unit 702 between the top end 701 and the bottom end 703. The linear actuator 710 is fixedly coupled to the transplanter 100 and as shown, the rod end is coupled to the intermediary unit 702. As the linear actuator 710 is extended or retracted, the intermediary unit 702 slides within the channel track 718 in the horizontal direction 712.

Construction of the intermediary unit 702 is explained in further detail as depicted in FIG. 5. The intermediary unit 702 further comprises a plurality of tubes 704. In one embodiment, the number of tubes 706 is equal to the number of saplings 518 in a row 520 of the tray 510 and/or the number gripping units provided on the gripping head. In one embodiment, the intermediary unit 702 has eight tubes to accommodate eight saplings. Each tube 706 further comprises a top 708, a bottom 709, a length of the tube 706 extends between the top 708 and the bottom 709. The top 708 is configured to receive a sapling 518 and the bottom 709 is configured to drop the sapling 518. In a further embodiment, each tube 706 is a straight tube connecting the top 708 and bottom 709 openings.

In one embodiment, a discharge flap 714 is pivotably coupled with the bottom 709. The discharge flap is configured to be in a closed state or an open state. The discharge flap 714 for each tube 706 is kept in a close state by means of the base frame 716.

As shown in FIGS. 4 and 5, an aperture 715 is formed in and/or defined by the base frame 716. In an embodiment, the aperture 715 is designed with dimensions equal to the size of the discharge flap 714. However, enough tolerances are provided for free movement of the discharge flap 714 within the aperture 715. As shown in FIG. 5, the discharge flaps of the plurality of tubes 704 are kept in the closed state by means of the first surface 717 of the base frame 716. However, when a discharge flap 714 matches the position of the aperture 715 of the base frame 716, the discharge flap changes to the open state by gravity due to its own weight and the weight of the sapling (518) above the discharge flap (714). In an alternative embodiment, the discharge flaps (714) are operated by an actuating means to open and close. In another embodiment, the aperture 715 is placed at a center of a length of the base frame 716.

In an exemplary embodiment, as the linear actuator 710 retracts and pulls the intermediary unit 702 to the left, the discharge flap 714 on left side goes to the closed state automatically under influence of the aperture edges. At the same time, the right-side discharge flap remains open and the discharge flap connected to the right side tube, when aligned with the aperture moves to the open state. Similarly, if the intermediary unit 702 slides to right side, the discharge flaps coupled to left tube with respect to the aperture 715, open.

Figure 6:
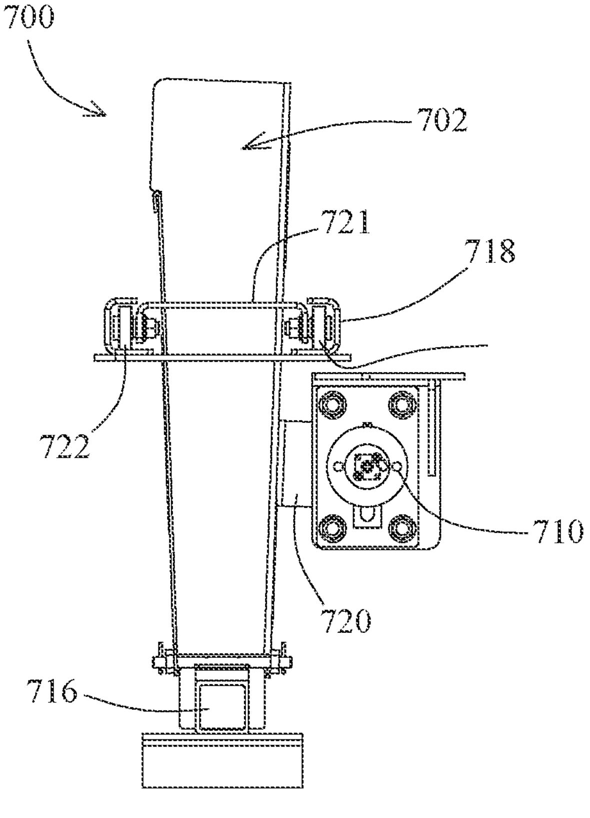
FIG. 6 illustrates a side plan view of the sampling indexing unit.

FIG. 6 shows a side view of the sapling indexing unit 700. As shown, the collar 721 is fixedly attached to the intermediary unit 702 periphery and rollers 722 are mounted to the collar 721. With the help of rollers 722, the intermediary unit 702 slides horizontally within the channel track 718. The linear actuator 710 is coupled the intermediary unit 702 through an L bracket 720.

Figures 7, 8:
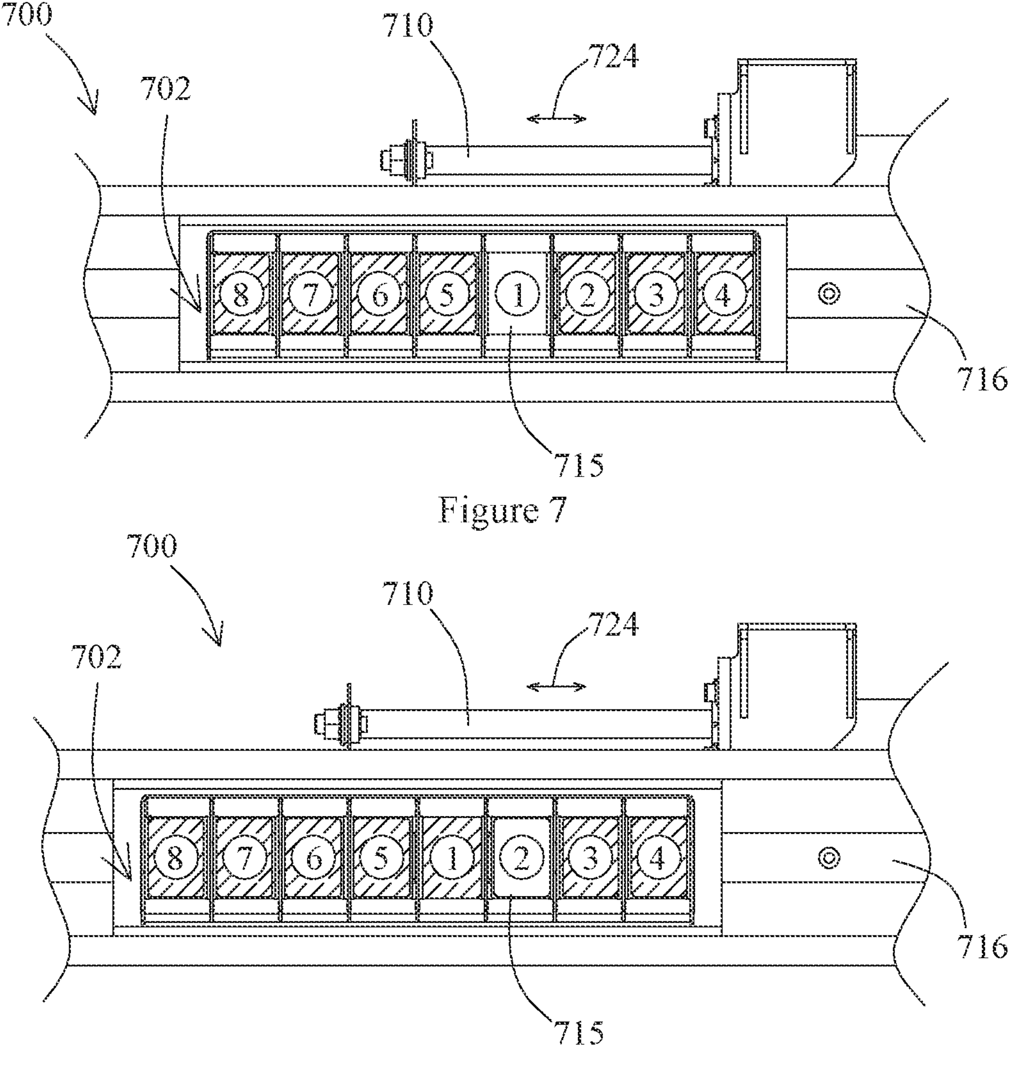
FIG. 7 illustrates a top view of the sapling indexing unit showing an exemplary sequence and a default position of the intermediary unit.
FIG. 8 illustrates a top view of the sampling indexing unit showing an exemplary sequence and a second position of the intermediary unit.

FIGS. 7 and 8 illustrate operation of an embodiment of predetermined sequencing. As shown, the tubes 706 are sequenced from 1 to 8 with tube 1 positioned at or around the center of the intermediary unit 702. Tube 1 is aligned with the aperture 715 and the discharge flap 714 is in the open state for tube 1. As the linear actuator 710 extends and moves the intermediary unit 702 to left, tube 2 aligns with the aperture 715, opening the discharge flap 714 for tube 2. The linear actuator 710 extends twice more to align the tubes 3 and 4. Once tube 4 is aligned with the apertures, the linear actuator 710 pulls the intermediary unit 702 such that tube 5 aligns with the aperture 715. Similarly, the actuator 710 pulls the intermediary unit 702 three times such that each of the tubes 6, 7, and 8 are aligned with aperture 715. For each step, the linear actuator 710 extends or retracts to a length equal to the width of the aperture or tubes. However, it is contemplated that any sequence could be followed according to design and need.

During operation of the transplanter 100, the sapling retrieval apparatus 400 moves the gripping head 420 close to the intermediary unit 702. As the gripping head 420 releases the saplings 518, each sapling 518 drops into a tube 706 and stays on the closed discharge flap 714 of the respective tube 706. An advantage of this design is that drag and friction between the saplings in the tubes 706 and the base frame 716 is eliminated or minimized. Following the sequence described above, tube 1 is aligned with the aperture 715 initially, the sapling 518 dropped into the tube 1 further drops through the bottom 709 directly to the sapling planting unit 300. At this stage, the controller 180 extends the linear actuator 710 and aligns tube 2 with the aperture 715 of the base frame 716. Since tube 2 is now aligned, the discharge flap of tube 2 opens allowing the drop of sapling 518 from tube 2. This cycle is repeated for all tubes 704 of the intermediary unit 702 to drop all saplings. Once all saplings are dropped, the controller 180 actuates the linear actuator 710 to extend and align tube 1 with the aperture 715.

Figure 9:
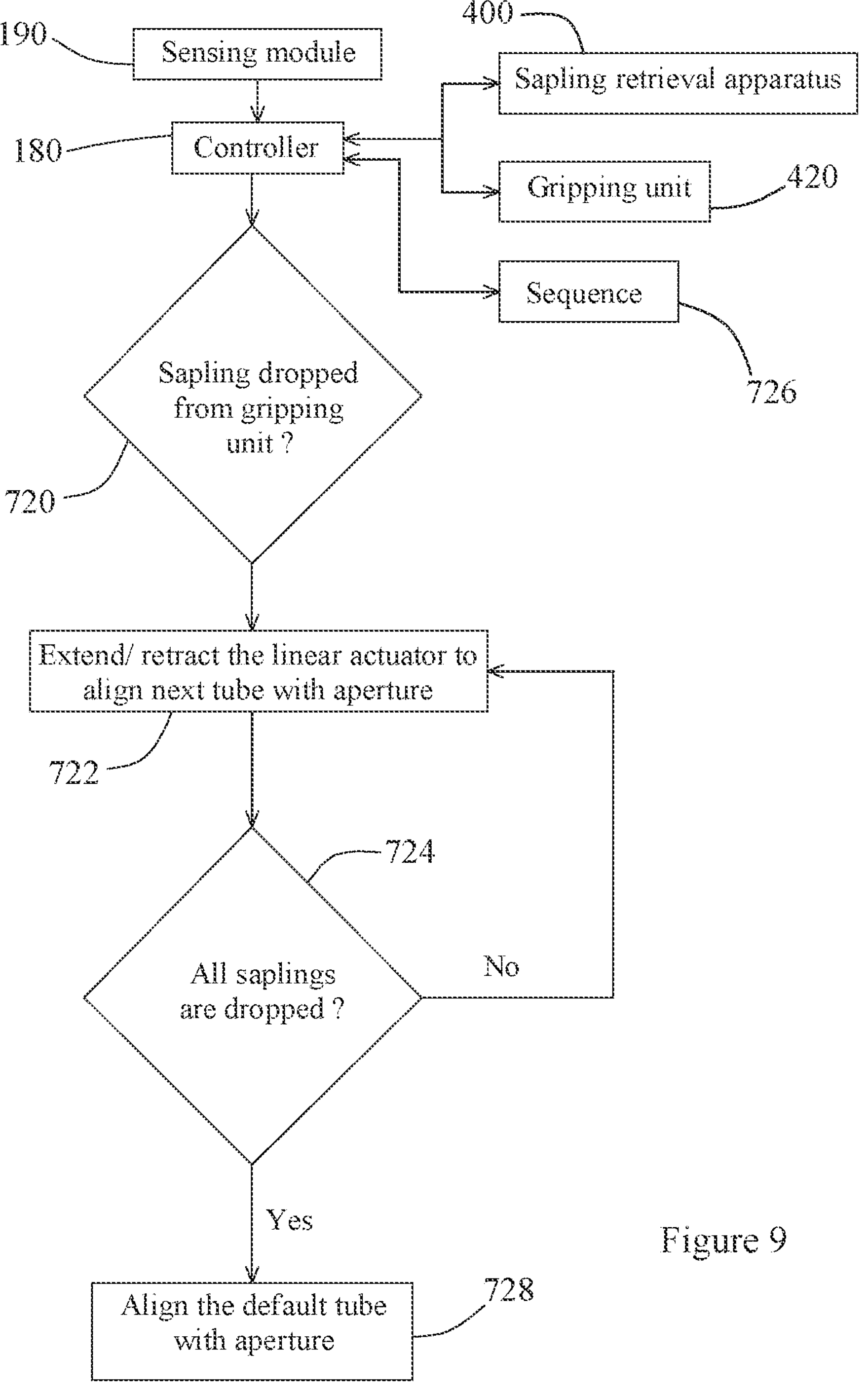
FIG. 9 illustrates a flow chart of the operation of the sapling indexing unit by a controller.

FIG. 9 illustrates the flow of events for working of the sapling indexing unit 700. Controller 180 operates the sapling retrieval apparatus 400 and the gripping head 420 to drop the row of saplings 520 to the intermediary unit 702. At this stage, by default a sapling will drop from the indexing unit 700. At stage 722, controller 180 follows the predetermined sequence as discussed above (as shown in FIGS. 7 and 8) and actuate the drive mechanism 710 to move the intermediary unit 702 to align the next tube 706 per sequence with the aperture 715 on base frame 716. The drive unit 710 continues to move the intermediary unit 702 to align each tube 706 to align with the aperture 715 per sequence. At step 724, once the controller 180 identifies that all saplings 518 are dropped or the sequence is completed, the drive unit 710 returns the intermediary unit 702 to the default location such that the first tube aligns with the aperture 715.

In an embodiment, the predetermined sequence is stored in memory of the controller 180. It is contemplated that multiple sequences are stored in the memory. An operator may select any preferred sequence or may edit the sequence using the display in an operator station. The controller 180 through the sensing module may identify the tubes with saplings and empty tubes, and is configured to operate a partial cycle until all saplings are dropped or based on the operator input on when to stop the cycle.

In a further embodiment, the actuators may be linear actuators and may be selected from but not limited to hydraulic actuators, electric actuators, and pneumatic actuators. However, any other kind of actuators can be used to drive the sapling indexing unit 420.

Various features are set forth in the following claims.

What is claimed is:

1. A sapling indexing system for a transplanter comprising:

a channel track;

an intermediary unit movably coupled to the channel track, the intermediary unit comprising a plurality of tubes each having a top and a bottom, wherein a discharge flap is pivotably coupled to the bottom of at least one of the plurality of tubes, the discharge flap comprising an open state and a closed state;

a base frame proximal to the bottom of the plurality of tubes and an aperture defined by the base frame, wherein the base frame further comprises a first surface, wherein the intermediary unit is configured to move relative to the first surface, and wherein the first surface retains the discharge flap in the closed state; and a linear actuator configured to provide horizontal movement to the intermediary unit relative to the base frame.

2. The sapling indexing system of claim 1, wherein the plurality of tubes is arranged in a row.

3. The sapling indexing system of claim 1, wherein the intermediary unit comprises eight tubes.

4. The sapling indexing system of claim 1, wherein each tube of the plurality of tubes is configured to receive a sapling from a sapling gripping unit through the top.

5. The sapling indexing system of claim 1, wherein the discharge flap is configured to hold a sapling during the closed state and drop the sapling during the open state.

6. The sapling indexing system of claim 1, wherein the first surface comprises a low friction material.

7. The sapling indexing system of claim 1, wherein each discharge flap switches to the open state when the discharge flap aligns with the aperture.

8. The sapling indexing system of claim 1, wherein the sapling indexing system comprises a controller to operate the linear actuator.

9. The sapling indexing system of claim 8, wherein the linear actuator aligns each tube of the plurality of tubes with the aperture in a predetermined sequence.

10. The sapling indexing system of claim 9, wherein the predetermined sequence includes aligning the aperture with a tube selected from a center of the plurality of tubes.

11. A sapling indexing system for a transplanter comprising:

a channel track;

an intermediary unit movably coupled to the channel track, the intermediary unit comprising a plurality of tubes each having a top and a bottom and arranged vertically and in a row, wherein a discharge flap is pivotably coupled to the bottom of at least one of the plurality of tubes, the discharge flap comprising an open state and a closed state;

a base frame proximal to the bottom of the plurality of tubes and an aperture defined by the base frame, wherein the base frame further comprises a first surface, wherein the intermediary unit is configured to move relative to the first surface, and wherein the first surface retains the discharge flap in the closed state; and a linear actuator configured to provide horizontal movement to the intermediary unit relative to the base frame.

12. A sapling indexing system for a transplanter comprising:

a channel track;

an intermediary unit movably coupled to the channel track, the intermediary unit comprising a plurality of tubes each arranged vertically and having a top and a bottom, wherein a discharge flap is pivotably coupled to the bottom of at least one of the plurality of tubes, the discharge flap comprising an open state and a closed state;

a base frame proximal to the bottom of the plurality of tubes and an aperture defined by the base frame, wherein the base frame further comprises a first surface, wherein the intermediary unit is configured to move relative to the first surface, and wherein the first surface retains the discharge flap in the closed state;

a linear actuator configured to provide horizontal movement to the intermediary unit relative to the base frame; and a controller configured to operate the linear actuator;

wherein the discharge flap is configured to hold a sapling during the closed state and drop the sapling during the open state.

13. The sapling indexing system of claim 12, wherein the discharge flap switches to the open state when the discharge flap aligns with the aperture.

* * * * *